3,437,617
FOG RESISTANT COATING COMPOSITIONS
Lewis F. Bogle, Enfield, Conn., assignor to Monsanto Company, St. Louis, Mo., a corporation of Delaware
No Drawing. Continuation-in-part of application Ser. No. 371,781, June 1, 1964. This application Oct. 27, 1966, Ser. No. 589,801
Int. Cl. C09k 3/18
U.S. Cl. 260—22
10 Claims

ABSTRACT OF THE DISCLOSURE

A coating composition for rendering polystyrene surface non-fogging which includes an alkyd resin, a primary surfactant which is either an alkyl aryl fatty sulfate or salt thereof, an alkylaryl fatty sulfate or salt thereof, or an alkyl ester of a polyoxyethylene, and a secondary surfactant which is an alkyl fatty sulfate or salt thereof dissolved in a solvent blend of a 5 to 10 carbon hydrocarbon, an aliphatic alcohol and water.

---

This application is a continuation-in-part of copending application Ser. No. 371,781 filed June 1, 1964 and now abandoned.

This invention relates to anti-fogging compositions for polystyrene articles, and particularly for biaxially oriented polystyrene film or sheeting of the type used for packaging moisture-containing products. The invention also includes biaxially oriented polystyrene film coated with the novel coating composition and packages made wholly or partially from such coated film.

Polystyrene film is normally transparent and is used as a packaging material, or as a window in cartons, for various foods, and particularly for moisture-containing foodstuffs such as vegetables, fruit, fresh meat, bacon, sausages, etc. The untreated polystyrene film while effectively protecting the contents of the package from outside contamination, is subject to an important disadvantage in that it tends to become fogged with small droplets of water when the temperature of the package drops sufficiently to cause condensation of moisture on the inner surface of the wrapping material. The formation of droplets in such cases is attributable to the hydrophobic surface quality of the wrapping material, and represents a substantial sales disadvantage in that it mars the appearance of the package and prevents the potential purchaser from viewing the contents.

The principal object of this invention is to provide a transparent, non-toxic, flexible, lubricous, tenacious coating composition for rendering the surface of polystyrene articles non-fogging. A more specific object is to provide a coating composition containing a particular alkyd resin and comprising a solvent system highly effective for dissolving the coating material and suitable for application to biaxially oriented polystyrene without dissolving the latter. Another object is to provide non-fogging transparent polystyrene film or sheet which is coated on at least one of its surfaces with the novel lubricous coating composition and thus to provide a means or method for producing packages made at least partially of polystyrene and capable of remaining transparent for long periods of time in a highly humid environment. These and other objects, as well as the scope, nature and utilization of the invention will become more clearly apparent from the following description and appended claims.

Various coating compositions have been heretofore proposed for the purpose of preventing the fogging of transparent packages. However, particularly in the case of polystyrene film, no truly satisfactory composition of this kind has been heretofore available. For instance, compositions based principally on certain surface active sulfated or sulfonated organic materials have been found fairly effective for reducing the fogging but they have not been widely accepted because, when applied to polystyrene film, they greatly reduce the coefficient of friction of the film and thus create handling problems when the treated film is wound on and unwound from rolls. Also, many such coating compositions do not adhere to the film with the required tenacity, sometimes impair its clarity, etc.

After extensive research, it has now been discovered that satisfactory results can be obtained, and the disadvantages typical of the prior art avoided, by formulating an anti-fogging composition based on a mixture consisting essentially of an alkyd resin based upon rosin acids or terpene hydrocarbons, a primary surfactant which is either an alkyl aryl fatty sulfonate or salt thereof, an alkyl aryl fatty sulfate or salt thereof, or an alkyl ester of a polyoxyethylene, and a secondary surfactant which is an alkyl fatty sulfate or salt thereof; provided, however, that the composition is applied in the form of a solution employing a carefully selected solvent system comprising a mixture of one or more liquid hydrocarbons with one or more aliphatic alcohols and a minor proportion of water.

The anti-fogging coating composition of this invention consists essentially of a mixture of three principal classes of non-volatile components in appropriate concentrations which are dissolved in a carefully chosen blend of solvents having a proper balance of boiling points and evaporation rates, as well as ability to dissolve the solid components without dissolving the polystyrene.

Suitable ranges for the non-volatile components, expressed in weight percent based on the total weight of the said components, are as follows: (1) alkyd resin from 50 to 90%, preferably from 62 to 72%, (2) primary surfactant from about 5 to 35%, preferably from about 17 to 27% and (3) secondary surfactant from about 5 to 15%, preferably from about 8 to 13%. A particularly good formula comprises approximately: (1) 65–70% alkyd resin, (2) 20–25% primary surfactant, and (3) 10–12% secondary surfactant.

The alkyd resin used is a derivative of rosin or rosin acids, a modified rosin, or modified terpene hydrocarbons. Thus, in one embodiment the alkyd resins are the polyhydric alcohol esters of rosin acids. In another embodiment the alkyd resins are the alpha, beta-ethylenically unsaturated polycarboxylic acid, or anhydride, adducts of rosin acids or the polyhydric alcohol esters thereof. In still another embodiment the alkyd resins are the alpha, beta-ethylenically unsaturated polycarboxylic acid, or anhydride, adducts of terpene hydrocarbons or the polyhydric alcohol esters thereof.

The rosin or rosin acids used may be any of those ordinarily employed such as gum or wood rosin, pure oleorosin, sapinic acids, pimaric acids, abietic acids, etc. In addition, there may be used polymerized, disproportionated, or hydrogenated rosin, or the rosin fractions of tall oil, all of which materials are herein broadly referred to as rosin acids. Terpene hydrocarbons include alpha-pinene, beta-pinene, dipentene, d-limonene, 1-limonene, terpinoline, p-cymene, $\Delta^3$-carene, sabinene, camphane, p-menthane, alphaterpinene, etc.

In greater detail, polyhydric alcohols which may be esterified with the rosin acids or the polycarboxylic acid adducts specified above include, for example, ethylene glycol, propylene glycol, butylene glycol, polyethylene glycols, polypropylene glycols, glycerol, diglycerol, triglycerol, higher polyglycerols, pentaerythritol, dipentaerythritol, higher pentaerythritols, 2,2,6,6-tetramethylolcyclohexanol, 3,3,5,5 - tetramethylol-pyran-4-ol, 3,3,5-trimethylol-5-methylpyran-4-ol, erythritol, xylitol, sorbitol, mannitol, sucrose, and the like. The alpha, beta-ethylenically unsaturated polycarboxylic acids which may be adducted with the rosin acids include, for example, maleic acid, fumaric acid, citraconic acid, mesaconic acid, aconitic acid, itaconic acid, and the like. Where available, the anhydrides of these acids may be used in their place.

Most of these alkyd resins are commercially available. The polyhydric alcohol esters of rosin acids (naturally available as ester gum) include the glycerol esters and the pentaerythritol esters commercially available under a variety of trade names such as "Amberol," "Pentalyn," "Cellolyn," etc. Methanol and phenol modified esters include resins commercially available under the trade names "Abalyn," "Amberol," etc. characterized by an acid number of between about 30–50 and a softening point between about 130°–140° C. Adducts of alpha, beta-ethylenically unsaturated polycarboxylic acid or acid anhydride and terpene hydrocarbons include resins commercially available under the trade name "Petrex" acid. Adducts of alpha,beta-ethylenically unsaturated polycarboxylic acids and rosin acids include maleic modified rosin acids and maleic modified rosin acid/glycerol esters commercially available under a variety of trade names such as "Lewisol," "Amberol," "Amberlac," "Cellolyn," etc.

The primary surfactant employed in the coating compositions of this invention may be an alkyl aryl fatty sulfonate or a salt thereof, an alkyl aryl fatty sulfate or a salt thereof, or an alkyl ester of a polyoxyethylene containing an average of from 4 to 20 units of ethylene oxide per polyoxyethylene chain. Exemplary of such primary surfactants are the alkyl aryl fatty sulfonates and their alkali metal or ammonium salts such as dodecyl benzene sulfonate, dodecyl benzene sodium sulfonate, dodecyl benzene ammonium sulfonate, lauryl benzene sulfonate, dodecyl p-toluene sodium sulfonate, alkyl naphthalene sulfonates, etc.; alkyl aryl fatty sulfates and their alkali metal or ammonium salts such as sodium nonyl phenol tetraethoxy sulfate, etc.; and alkyl esters of polyoxyethylenes such as polyoxyethylene(4)sorbitan monolaurate, polyoxyethylene(20)sorbitan tristearate, etc. In any of the above surfactants, the ammonium, sodium, potassium, lithium, rubidium and ceseium salts function equally as well, although some may be more readily available than others.

The secondary surfactant employed in the coating compositions of this invention is an alkyl fatty sulfate or a salt thereof. Exemplary of the same are alkyl fatty sulfates and their alkali metal, ammonium or amine salts such as sodium lauryl sulfate, sodium tallow alcohol sulfate, diethanolamine lauryl sulfate, potassium nonyl sulfate, etc. The ammonium, amine, sodium, potassium, lithium, rubidium, and cesium salts function equally as well, although some may be more readily available than others.

The solvent blend employed in formulating the coating compositions of this invention is a mixture of a hydrocarbon of from 5 to 10 carbon atoms with an aliphatic alcohol of from 1 to 4 carbon atoms and water. Suitable hydrocarbons include, for example, toluene, xylene, pentane, hexane, cyclohexane, heptane, n-octane, isooctane, n-nonane, n-decane, etc. Mixtures of aromatic and aliphatic hydrocarbons may be used provided such mixtures do not form a solvent for the polystyrene substrate. Similarly, mixtures of aliphatic hydrocarbons or mixtures of aromatic hydrocarbons may be used. Suitable aliphatic alcohols include, for example, methanol, ethanol, propanol, isopropanol, n-butane-1-ol, n-butane-2-ol, sec.-butanol, 2-methylpropan-1-ol, etc.

The solvent blend itself is comprised of (a) from 20 to 90%, and preferably 65 to 80%, by weight of the 5–10 carbon hydrocarbon, (b) from 10 to 80%, and preferably 20 to 30%, by weight of the 1–4 carbon alcohol and (c) from 0.1 to 5% and preferably 0.8 to 1.8%, by weight of water; the total of all percentages being 100%. These figures represent the composition of the solvent blend, without any solid component present. The proportions of the various components used in the solvent blend as well as the nature of those components, e.g., whether an aromatic or aliphatic hydrocarbon will be used, is largely determined by the nature of the alkyd resin used. For example, the pentaerythritol esters of rosin acids are the preferred alkyd resins in which case it is preferred to use an aliphatic hydrocarbon in the solvent blend in the proportions recited above in this paragraph as being preferred.

Generally, the coating composition will comprise from about 90 to 99.5% by weight of the solvent blend and, correspondingly, from 10 to 0.5% by weight of the non-volatile or solid component as, and in the proportions, heretofore discussed. Preferably, at least 2% of the nonvolatiles are employed in the coating composition since the anti-fogging properties of the coated product tend to become inadequate if only a single coat of a more dilute coating composition is applied. When the nonvolatiles are present in concentrations greater than about 10%, the coating tends to become hazy.

The coating composition may be applied to the polystyrene article by any conventional coating method, such as by rotogravure. The quantity of the coating applied may be such that the dry coating weight is from about 25 to 125 micrograms/sq. in. The optimum dry coating weight has been found to be about 50 micrograms/sq. in.

The invention is of particular interest in connection with biaxially oriented polystyrene film, i.e. with thin, flexible film which has been stretched or cold drawn about 50 to 300% of its original length along its two principal axes so as to cause orientation and thereby increase both strength and clarity. Such polystyrene film typically may range in thickness from about 0.0005 to 0.01 inch.

The following examples are presented in illustration of the invention and are not intended as limitations thereof. Where parts are used they are parts by weight unless otherwise stated.

Example I

A solvent blend is made up by mixing 740 parts of n-hexane, 250 parts of sec.-butanol and 15 parts of water. To 1000 parts of this solvent blend are added 14.8 parts of "Pentalyn 255" (an alkyd resin formed by esterifying rosin acids comprised largely of abietic acid with pentaerythritol and characterized by an acid number of 190–220 and a softening point of 169–181° C.), 4.7 parts of polyoxyethylene(4)sorbitan monolaurate (available commercially under the trade name "Tween 20," and characterized as a yellow oily liquid having a viscosity at 25° C. of 400 cps., a specific gravity of 1.1 at 25° C.) and 2.4 parts of sodium lauryl sulfate. The mixture is stirred until a homogeneous solution is obtained. The resulting solution is then applied by rotogravure onto one side of 0.001 inch thick biaxially oriented polystyrene film at a dry coating weight of 50 micrograms per square inch. Conventional forced hot air is employed to dry the coated film. Samples of this coated film are used as window material in commercial bacon cartons and exposed to 24 hour cycles of 40° F. followed by 1 hour at 73° F. Control samples, bacon cartons containing windows of uncoated oriented polystyrene are also similarly exposed. The controls are heavily fogged after 1 hour at 40° F. while the coated film is not fogged after three such 24 hour cycles.

Example II

Example I is repeated substituting "Petrex acid" (an alkyd resin formed by reacting maleic acid with terpene hydrocarbons) for the "Pentalyn 255" employed therein. Substantially equivalent results are obtained. "Petrex acid" is characterized by an acid number of 515–535, a softening point of 45–52° C., and a specific gravity of 1.10.

Example III

Example I is repeated substituting "Cellolyn 102" (an alkyd resin formed by esterifying a maleic anhydride modified rosin acid with a polyhydric alcohol such as glycerol) for the "Pentalyn 255" employed therein. Substantially equivalent results were obtained. "Cellolyn 102" is characterized by an acid number of 30–40, a softening point of 131–137° C. and a specific gravity of 1.13.

Example IV

Example I is repeated substituting for the "Pentalyn 255," the glycerol ester of moleic anhydride-alpha-pinene adduct (an alkyd resin formed by esterifying a maleic acid modified terpene hydrocarbon). Substantially equivalent results are obtained.

Example V

Example I is repeated substituting for the "Pentalyn 255," a different alkyd resin, namely, a maleic anhydride-rosin acid adduct. Substantially equivalent results are obtained.

Example VI

Example I is repeated substituting lauryl benzene sulfonate for the polyoxyethylene(4)sorbitan monolaurate. Substantially equivalent results are obtained.

Example VII

Example I is repeated substituting dodecyl benzene sodium sulfonate, available commercially under the trade name Santomerse SX, and characterized by a pH of 8.5 (1% aqueous solution), and 0.3% inorganic salt content, for the polyoxyethylene(4)sorbitan monolaurate. Substantially equivalent results are obtained.

Example VIII

Example II is repeated substituting dodecyl benzene ammonium sulfonate for the polyoxyethylene(4)sorbitan monolaurate. Substantially equivalent results are obtained.

Example IX

Example III is repeated substituting nonyl phenol tetraethoxy sulfate for the polyoxyethylene(4)sorbitan monolaurate. Substantially equivalent results are obtained.

Example X

Example III is repeated substituting sodium nonyl phenol tetraethoxy sulfate for the polyoxyethylene(4)sorbitan monolaurate. Substantially equivalent results are obtained.

Example XI

Example IV is repeated substituting ammonium nonyl phenol tetraethoxy sulfate for the polyoxyethylene(4)sorbitan monolaurate. Substantially equivalent results are obtained.

Example XII

Example V is repeated substituting lauryl sulfate for the sodium lauryl sulfate. Substantially equivalent results are obtained.

Example XIII

Example V is repeated substituting ammonium lauryl sulfate for the sodium lauryl sulfate. Substantially equivalent results are obtained.

Example XIV

Example V is repeated substituting diethanolamine lauryl sulfate for the sodium lauryl sulfate. Substantially equivalent results are obtained.

While only certain embodiments of the invention have been described herein, it will be apparent to those skilled in the art that the principle of the invention may be embodied in various other ways without departing from the spirit or scope thereof. The scope of the invention is particularly pointed out in the appended claims.

What is claimed is:

1. A coating composition consisting essentially of from 0.5 to 10% by weight of a nonvolatile portion (A) containing, on a dry basis, (1) from 50 to 90% by weight of an alkyd resin, (2) from 5 to 35% by weight of a primary surfactant selected from the group consisting of alkyl aryl fatty sulfonates and the alkali metal and ammonium salts thereof, alkyl aryl fatty sulfates and the alkali metal and ammonium salts thereof, and the alkyl esters of polyoxyethylenes containing an average of from 4 to 20 ethylene oxide units per polyoxyethylene chain, and (3) from 5 to 15% by weight of a secondary surfactant selected from the group consisting of alkyl fatty sulfates and the alkali metal, ammonium and amine salts thereof and, correspondingly, from 99.5 to 90% by weight of a solvent blend (B) consisting essentially of (1) from 45 to 90% by weight of 5–10 carbon liquid hydrocarbon, (2) from 10 to 50% by weight of a 1–4 carbon atom aliphatic alcohol, and (3) from 0.1 to 5% by weight of water; said alkyd resin being selected from the class consisting of the polyhydric alcohol esters of rosin acids, the alpha, beta-ethylenically unsaturated polycarboxylic acid anhydride adducts of rosin acids and the polyhydric alcohol esters thereof, and the alpha, beta-ethylenically unsaturated polycarboxylic acid adducts of terpene hydrocarbons and the polyhydric alcohol esters thereof.

2. A coating composition as in claim 1 wherein the alkyd resin is a pentaerythritol ester of rosin acids.

3. A coating composition as in claim 1 wherein the primary surfactant is polyoxyethylene(4)sorbitan monolaurate.

4. A coating composition as in claim 1 wherein the secondary surfactant is sodium lauryl sulfate.

5. A coating composition as in claim 1 wherein the primary surfactant is polyoxyethylene(4)sorbitan monolaurate and the secondary surfactant is sodium lauryl sulfate.

6. A coating composition as in claim 1 wherein the nonvolatile portion (A) contains, on a dry basis (1) from 50 to 90% by weight of a pentaerythritol ester of rosin acids, (2) from 5 to 35% by weight of polyoxyethylene (4)sorbitan monolaurate, and (3) from 5 to 15% by weight of sodium lauryl sulfate.

7. A coating composition consisting essentially of from 0.5 to 10% by weight of a nonvolatile portion (A) containing, on a dry basis, (1) from 50 to 90% by weight of a pentaerythritol ester of rosin acids, (2) from 5 to 35% by weight of polyoxyethylene(4)sorbitan monolaurate, and (3) from 5 to 15% by weight of sodium lauryl sulfate and, correspondingly, from 99.5 to 90% by weight of a solvent (B) consisting essentially of (1) from 45 to 90% by weight of n-hexane, (2) from 10 to 50% by weight of sec.-butanol and (3) from 0.1 to 5% by weight of water.

8. A non-fogging transparent polystyrene film having applied to at least one side thereof a coating consisting essentially of, on a dry basis, (1) from 50 to 90% by weight of an alkyd resin, (2) from 5 to 35% by weight of a primary surfactant selected from the group consisting of alkyl aryl fatty sulfonates and the alkali metal and ammonium salts thereof, alkyl aryl fatty sulfates and the alkali metal and ammonium salts thereof, and the alkyl esters of polyoxyethylenes containing an average of from 4 to 20 ethylene oxide units per polyoxyethylene chain, and (3) from 5 to 15% by weight of a secondary surfactant selected from the group consisting of alkyl fatty sulfates and the alkali metal, ammonium and amine salts thereof; said alkyd resin being selected from the class consisting of the polyhydric alcohol esters of rosin acids, the alpha,beta-ethylenically unsaturated polycarboxylic acid anhydride adducts of rosin acids and the polyhydric alcohol esters thereof, and the alpha,beta-ethylenically unsaturated polycarboxylic acid adducts of terpene hydrocarbons and the polyhydric alcohol esters thereof.

9. A non-fogging transparent polystyrene film having applied to at least one side thereof a coating consisting essentially of, on a dry basis, (1) from 50 to 90% by weight of a pentaerythritol ester of rosin acids, (2) from 5 to 35% by weight of polyoxyethylene(4)sorbitan monolaurate, and (3) from 5 to 15% by weight of sodium lauryl sulfate.

10. As an article of manufacture, a moisture-containing foodstuff enclosed in a packaging material comprising a transparent polystyrene film having applied to at least the inner surface thereof a coating consisting essentially of, on a dry basis, (1) from 50 to 90% by weight of an alkyd resin, (2) from 5 to 35% by weight of a primary surfactant selected from the group consisting of alkyl aryl fatty sulfonates and the alkali metal and ammonium salts thereof, alkyl aryl fatty sulfates and the alkali metal and ammonium salts thereof, and the alkyl esters of polyoxyethylenes containing an average of from 4 to 20 ethylene oxide units per polyoxyethylene chain, and (3) from 5 to 15% by weight of a secondary surfactant selected from the group consisting of alkyl fatty sulfates and the alkali metal, ammonium and amine salts thereof; said alkyd resin being selected from the class consisting of the polyhydric alcohol esters of rosin acids, the alpha,beta-ethylenically unsaturated polycarboxylic acid anhydride adducts of rosin acids and the polyhydric alcohol esters thereof, and the alpha,beta-ethylenically unsaturated polycarboxylic acid adducts of terpene hydrocarbons and the polyhydric alcohol esters thereof.

References Cited

UNITED STATES PATENTS

| | | | |
|---|---|---|---|
| 2,128,973 | 9/1938 | Tisdale | 106—237 |
| 2,561,010 | 7/1951 | Carson | 99—174 |
| 2,931,732 | 4/1960 | Hoffman et al. | 99—174 |
| 3,048,266 | 8/1962 | Hackhel et al. | 99—174 |
| 3,218,178 | 11/1965 | Pava | 99—174 |
| 3,222,210 | 12/1965 | Hammond | 99—174 |
| 3,306,755 | 2/1967 | Sincock et al. | 99—174 |

DONALD E. CZAJA, *Primary Examiner.*

R. W. GRIFFIN, *Assistant Examiner.*

U.S. Cl. X.R.

106—219, 237, 238, 239; 117—6, 138.8, 167, 168; 99—174; 260—29.2, 30.8, 32.4, 32.6 33.2 33.4, 33.6